Feb. 6, 1923.
A. S. WALLACE.
TIRE TOOL.
FILED JULY 26, 1920.
1,444,226.
2 SHEETS—SHEET 1.
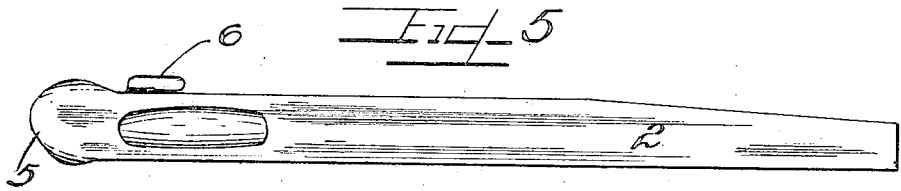
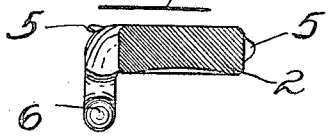
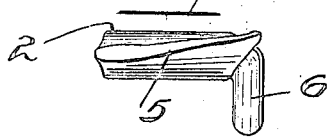
Witnesses
Maxine M. Jackson
Earl M. Hardine
Inventor
Albert S. Wallace
by Charles D. Niees
Atty.

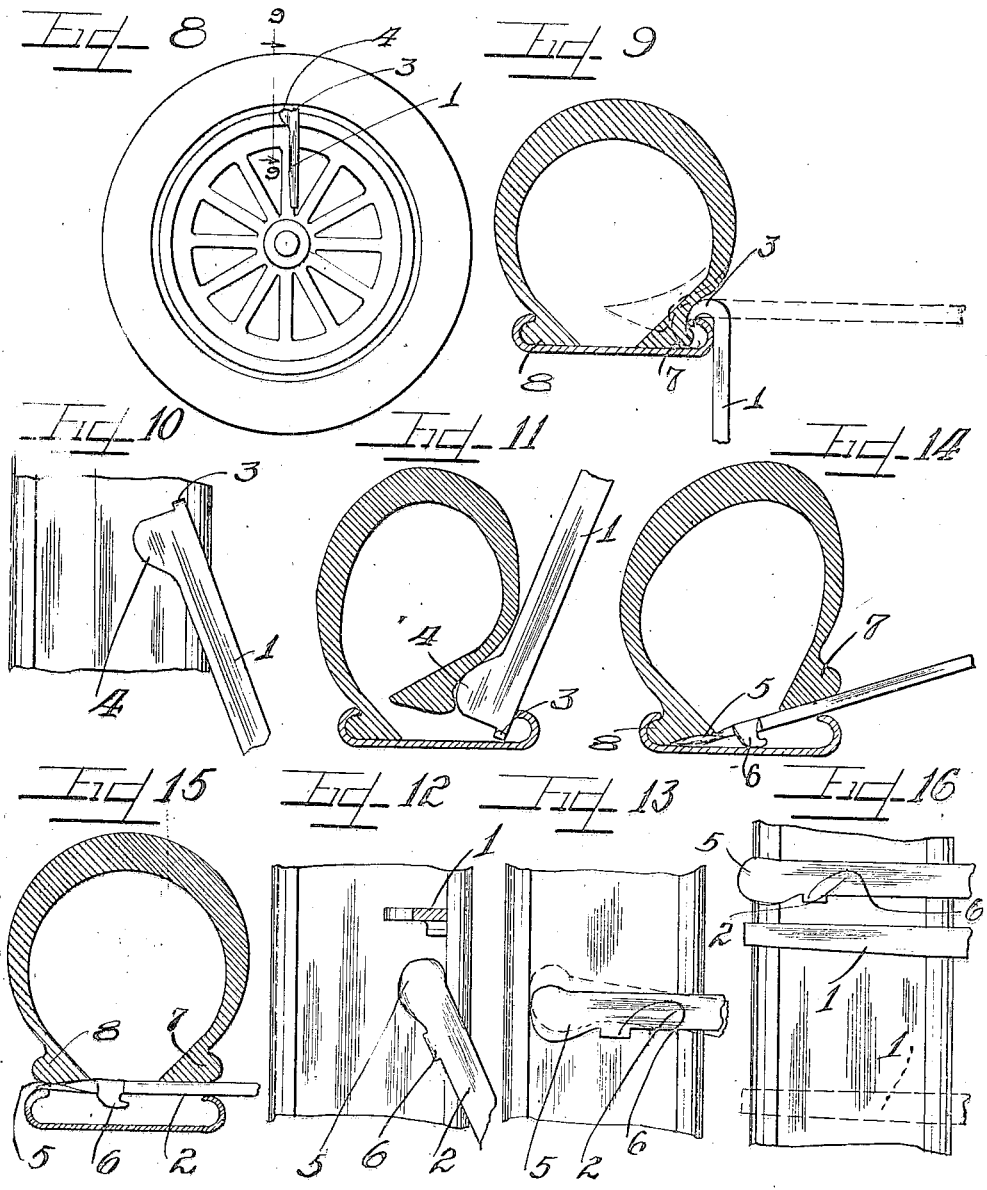

Patented Feb. 6, 1923.

1,444,226

UNITED STATES PATENT OFFICE.

ALBERT S. WALLACE, OF CHICAGO, ILLINOIS.

TIRE TOOL.

Application filed July 26, 1920. Serial No. 399,032.

*To all whom it may concern:*

Be it known that I, ALBERT S. WALLACE, a citizen of the United States, and a resident of the city of Chicago, in the county of Cook and State of Illinois, have invented certain new and useful Improvements in Tire Tools; and I do hereby declare that the following is a full, clear, and exact description of the same, reference being had to the accompanying drawings, and to the numerals of reference marked thereon, which form a part of this specification.

This invention relates to tools for removing clincher tires from automobile wheels. The chief difficulty in tire removal is to lift one part of the tire over the adjacent portion of the rim when the rest of the tire may be quickly detached.

It is an object, therefore, of the present invention to provide improved means for disengaging one part of the tire from the adjacent portion of the rim.

Another object of the invention is to provide a pair of tire tools, one adapted to disengage one bead and the other adapted to disengage the other bead from the rim of the wheel.

Other and further important objects of this invention will be apparent from the disclosures in the specification and drawings.

The invention (in a preferred form) is illustrated in the drawings and hereinafter more fully described.

On the drawings:

Figure 1 is a plan view of one of the tire tools.

Figure 2 is a side view of the same.

Figure 3 is a top plan view of the second tire tool.

Figure 4 is a side view of the second tire tool.

Figure 5 is a bottom plan view of the second tire tool.

Figure 6 is a section on the line 6—6 of Figure 3.

Figure 7 is an end view of the second tool taken on the line 7—7 of Figure 3.

Figure 8 is a side view of an automobile wheel with the first tire tool applied thereto.

Figure 9 is a section on the line 9—9 of Figure 8.

Figure 10 is a plan view of a part of the rim and one of the tire tools showing the latter in its second operative position.

Figure 11 is a section similar to Figure 2 showing the first tire tool in its third position.

Figure 12 is a plan view of a part of the rim showing the second tire tool in its first operative position.

Figure 13 is a plan view similar to Figure 5, showing the second tool in its second position.

Figure 14 is a section through the tire and rim showing the second tool in its second position.

Figure 15 is a section through the tire and rim showing the second tool in its third position.

Figure 16 is a plan view of a part of the rim showing both tools in their final positions.

As shown in the drawings:

Two tire tools 1 and 2 are provided for aiding in the removal of the tire. The first of these, 1, is a flat bar provided with a hook 3 at its end for engagement with the rim of the wheel, as shown in Figures 1 and 2. Adjacent this hook is a lateral extension 4. The lever 1 is adapted to be hooked upon the rim as shown in Figures 8 and 9. The lever is then raised into horizontal position as shown in dotted line in Figure 9 and is given a lateral swinging movement to bring the same into the position shown in Figure 10; the hook-shaped end 3 serving as an anchor against the tire rim while the projection 4 in said lateral movement acts against the tire and pushes the same inwardly away from the rim bead. The lever 1 is next elevated into the position shown in Figure 11, an operation which raises the tire bead from the rim and directs the same inwardly to a considerable extent, forming the passageway thereunder for the next tool.

The second tool is a flat bar having a flattened end 5 which is twisted slightly to aid its insertion beneath the opposite bead of the tire. Along one edge of the tool is formed a downwardly and rearwardly projecting hook 6 adapted to engage the rim of the wheel and act as a pivot or fulcrum. As the tire is being held in the position shown in Figure 11, the second lever 2 is positioned adjacent the lever 1 in the position shown in Figure 12; the lug 6 upon the inner side of the sheet metal rim serving as a fulcrum. The lever 2 is now shifted laterally and forwardly to bring the same into a position transversely of the tire and under the bead 8 as shown in Figures 13 and 14, in which position, the sheet metal rim will serve as a fulcrum whereby pressure upon the outer end of said tool will raise the inner end thereof and lift the bead 8 of a tire out of the bead in the sheet metal rim, allowing thereby the tool 2 to be shifted underneath the bead 8 and upon the opposite bead of the sheet metal rim as shown in Figure 15, so that the tire is held above the supporting rim. The tool 1 may now be withdrawn and turned end for end, and the beveled handle thereof may be inserted under the tire and supported upon the two beads of the sheet metal rim as shown in Figure 16. Either one of the tools, but preferably the tool 1, may now be forced circumferentially around the sheet metal rim, prying the tire therefrom until a sufficient portion of the tire has been thuswise pried loose from the rim so that the tire may be removed by raising up on the levers as is obvious.

I am aware that numerous details of construction may be varied through a wide range without departing from the principles of this invention, and I therefore do not purpose limiting the patent granted otherwise than necessitated by the prior art.

I claim as my invention:

A tire removing tool comprising a bar having one edge substantially straight from end to end, a lug having a rounded or convex outer surface projecting from the opposite edge adjacent one end thereof, and having the end adjacent said lug in the form of a hook for the purpose set forth.

In testimony whereof I have hereunto subscribed my name in the presence of two subscribing witnesses:

ALBERT S. WALLACE.

Witnesses:
EARL M. HARDINE,
CHARLES W. HILLS.